(12) United States Patent
Kittell et al.

(10) Patent No.: US 11,990,631 B2
(45) Date of Patent: May 21, 2024

(54) BATTERY BANK WITH UNITARY BATTERY TERMINAL CONNECTOR STRAPS

(71) Applicant: Villara Corporation, McClellan, CA (US)

(72) Inventors: Robert P. Kittell, Brentwood, TN (US); Curtis Ray Wylie, Jr., Citrus Heights, CA (US); Calvin Richard Wylie, Roseville, CA (US); Eric S. Johnson, Cool, CA (US); William A. Landgraf, Carmichael, CA (US)

(73) Assignee: Villara Corporation, Mcclellan, CA (US)

( * ) Notice: Subject to any disclaimer, the term of this patent is extended or adjusted under 35 U.S.C. 154(b) by 69 days.

(21) Appl. No.: 17/691,054

(22) Filed: Mar. 9, 2022

(65) Prior Publication Data

US 2022/0294055 A1    Sep. 15, 2022

Related U.S. Application Data

(60) Provisional application No. 63/159,030, filed on Mar. 10, 2021.

(51) Int. Cl.
*H01M 50/209* (2021.01)
*H01M 50/258* (2021.01)

(52) U.S. Cl.
CPC ....... *H01M 50/209* (2021.01); *H01M 50/258* (2021.01); *H01M 2220/10* (2013.01)

(58) Field of Classification Search
CPC ............. H01M 50/209; H01M 50/258; H01M 50/502; H01M 50/503; H01M 50/516; H01M 2220/10; Y02E 70/30
See application file for complete search history.

(56) References Cited

U.S. PATENT DOCUMENTS

| | | | |
|---|---|---|---|
| 5,437,939 A * | 8/1995 | Beckley | B66F 9/07531 180/68.5 |
| 9,059,447 B2 | 6/2015 | Scheucher | |
| 10,312,484 B2 | 6/2019 | Conrardy et al. | |
| 2003/0003350 A1 * | 1/2003 | Heimer | H01M 50/253 429/97 |
| 2005/0058891 A1 * | 3/2005 | Marraffa | H01M 50/204 429/100 |
| 2005/0084748 A1 * | 4/2005 | Miller | H01M 10/6557 211/13.1 |
| 2010/0009251 A1 * | 1/2010 | Shin | H01M 50/296 429/158 |
| 2014/0225566 A1 * | 8/2014 | Scheucher | B60L 15/20 320/109 |

(Continued)

*Primary Examiner* — Matthew T Martin
*Assistant Examiner* — Adam J Francis
(74) *Attorney, Agent, or Firm* — Mark Protsik; Thomas Schneck

(57) ABSTRACT

A battery cabinet with a plurality of spaced apart shelves of equal width and depth. Each shelf supports a removable battery module. In turn, each module has a fixed adapter that holds batteries as a battery bank where the module and adapter occupy most of the space between shelves. Battery cells are vertically or horizontally aligned with terminals joined to comb-shaped straps with blades joined to battery terminals. The space between blades allows for thermal expansion without wear on terminals.

2 Claims, 7 Drawing Sheets

(56) References Cited

U.S. PATENT DOCUMENTS

| | | | |
|---|---|---|---|
| 2014/0229398 A1* | 8/2014 | Conrardy | G06Q 30/00 |
| | | | 705/330 |
| 2015/0162580 A1* | 6/2015 | Conrardy | H01M 50/204 |
| | | | 29/428 |
| 2017/0279172 A1* | 9/2017 | Tucker | H01M 50/249 |
| 2018/0261823 A1* | 9/2018 | Jan | H01M 50/507 |
| 2020/0203941 A1* | 6/2020 | Ing | H05K 1/118 |
| 2021/0066698 A1* | 3/2021 | Jin | H01M 50/516 |

* cited by examiner

BATTERY BANK WITH UNITARY BATTERY TERMINAL CONNECTOR STRAPS

CROSS-REFERENCE TO RELATED APPLICATION

The present application claims priority under 35 U.S.C. 119(e) from U.S. Provisional Application Ser. No. 63/159,030, filed Mar. 10, 2021 for Battery Energy Storage System.

TECHNICAL FIELD

The invention relates to battery energy storage systems and, in particular, to a bank of battery cells with unitary battery terminal connector straps joining rows of battery terminals within a low profile cabinet.

BACKGROUND ART

Inverters convert DC electrical energy to AC. Intelligent hybrid inverters are used in residential installations to receive DC from solar panels during the day and to pass through AC from the grid when solar energy is not available. Some intelligent hybrid converters divert power to store energy in a battery bank that is part of a battery energy storage system (BESS).

Scalable intelligent power supplies have been previously used in residential and automotive power systems. For example, U.S. Pat. No. 9,059,447 to K. Scheucher discloses a scalable battery bank using batteries in racks mounted in frames on shelves, as in a stack of shelves. Batteries are housed as removable cartridges for individual or group charging in a cabinet.

For residential applications, a low profile battery cabinet with a depth of less than 8 inches is desired for unobtrusive residential wall mounting. By selecting the cabinet depth as a primary consideration, battery selection is constrained.

An object of the invention was to provide a low profile battery cabinet with connection apparatus for a battery bank of resiliently and protectively joined battery cells.

SUMMARY OF DISCLOSURE

The above object has been achieved with a rectangular box shaped battery cabinet having a plurality of parallel, spaced apart shelves with each shelf supporting a battery module that seats a battery bank that fills most of the module or, alternatively, that seats an adapter that in turn seats a battery bank that occupies most of the module with the module as a lateral space divider with adapter dimensions that snugly fit selected identical battery cells. The cabinet has a preselected low profile depth dimensions, less than 8 inches, with shelves of slightly lesser depth. Width and height dimensions of the cabinet allow for a battery bank of desired energy capacity.

The adapter has upright side walls, a back wall and a cover projecting over the side walls as overhang regions. The space between side walls is occupied by identical batteries that are welded together with rigid fasteners. One side wall has an outwardly projecting foot coextensive with the cover projection for placement against upper and lower portions of a wall of a module. Overhang regions and back side fins for depth adjustment of the adapter provide spaces for wires or electronic sensors or circuits and serve to index the position of an adapter within a module.

Each module has an integral bottom wall with opposed side walls having upper and lower outwardly projecting protrusions from the opposed side walls. The upper protrusions serve as handles for lifting a module onto or from a shelf, while the lower protrusion provides space for fasteners to secure a module to a shelf. Back, front and a top wall close the module.

Cabinet shelves span the distance between vertical, spaced apart, side walls of the box shaped cabinet that includes a removable front cover with remaining walls fixed in place. The removable cover allows placement and fastening of modules on shelves. Each module has either a battery bank or the optional adapter fixed in place with commercial battery cells snugly secured between the upright side walls of each adapter. In a horizontal alignment embodiment battery cells are aligned so that terminals of a first polarity are in a column and terminals of the opposite polarity are in a subsequent column. Terminals of each polarity are connected to a comb-shaped battery strap where the comb has blades, each blade welded to a battery terminal. Back-to-back straps can be joined except at ends for parallel voltage alignment and stacked in series to increase voltage. For battery maintenance, a module is removed and replaced from a shelf. Once a module is removed, an adapter, if present, can be removed for access to individual battery cells.

DETAILED DESCRIPTION

Figure 1:
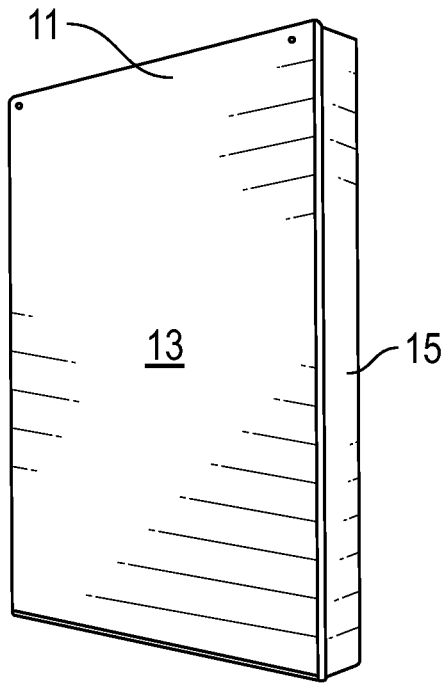
FIG. 1 is a front perspective external view of a low profile cabinet for a battery bank in accordance with the invention.

With reference to FIG. 1, a battery bank is housed in a low profile cabinet 11. By "low profile" is meant that the depth of the cabinet does not exceed 12 inches and is preferably slightly less than 7 inches. This means that batteries should be flat structures with flatness measured to be less than 7 inches. The present invention contemplates tight packing of such battery cells in the low profile cabinet 11.

A reason for a low profile cabinet is that use in residential applications can be engineered for solar applications, particularly for use with commercial intelligent hybrid inverters where a stored energy capacity of almost 12. Kwh is realized. In residential applications a low profile cabinet is useful in garages where cars occupy most of the available space.

Intelligent hybrid inverters that are mated to battery banks have electronic packages that often have a low profile. An objective is to provide a battery bank with a similar low profile.

Figure 2:
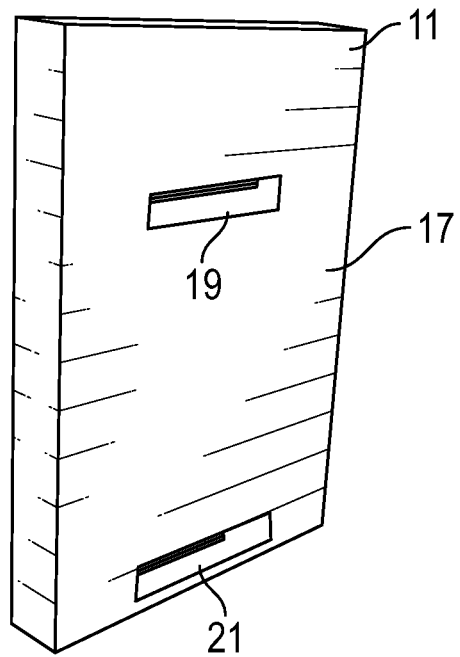
FIG. 2 is a rear perspective view of the apparatus of FIG. 1.

In FIG. 1 the low profile cabinet 11 has a removeable cover 13 fastened in place by corner screws. The cabinet 11 has a back wall and side walls 15 to provide a weather tight enclosure except for electrical connections in the side walls, not shown. In the rear view of FIG. 2 the back wall 17 of cabinet 11 is seen to have mounting bars 19 and 21 for hanging the cabinet 11 on short support rails, not shown, that are attached to a garage wall or the like. Clips secure the mounting bars in place but allow for removal for maintenance.

Figure 3:
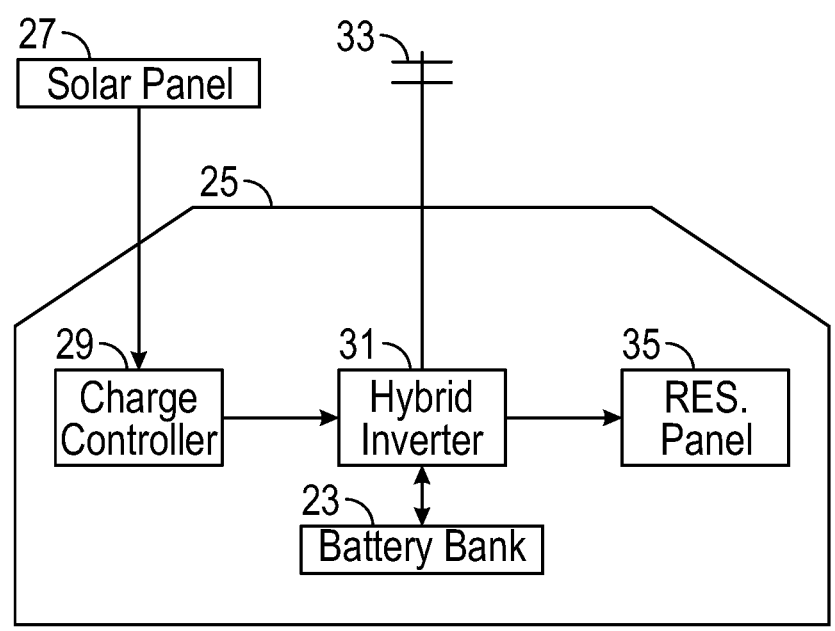
FIG. 3 is a diagrammatic view of a battery bank in a residential system having a solar panel and grid access to a hybrid inverter as known in the prior art.

In FIG. 3 a residence 25 houses a battery bank 23 that stores energy from a solar panel array 27 via a charge controller 29 and a hybrid inverter 31. The battery bank can either receive energy from grid 33 and store energy when solar power is not available or else can provide energy to grid 33 with excess power generated by the solar panel array. In either case the hybrid inverter sets the direction of energy flow depending on demands from a residential power panel 35. The configuration shown in FIG. 3 is known in the prior art. The present invention optimizes the container for battery bank 23.

Figure 4:
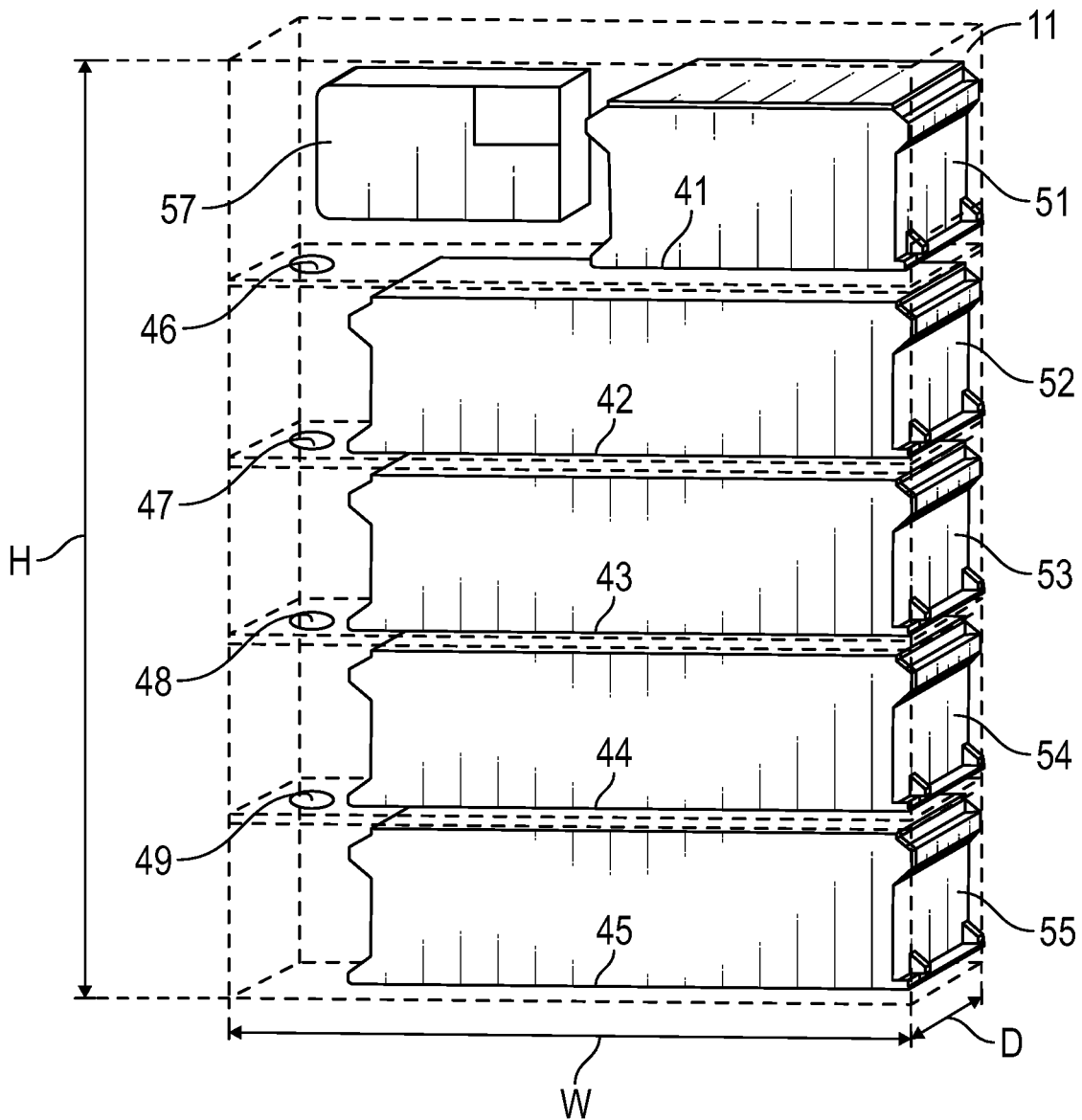
FIG. 4 is a phantom view of the cabinet of FIG. 1 showing phantom shelves supporting a plurality of battery modules, one module on each shelf.

In FIG. 4, a low profile metal battery cabinet 11, shown in dashed lines, is seen to have five internal shelves 41, 42, 43, 44 and 45. The cabinet 11 is seen to have a height, H, a width W and a depth D. The distance between shelves is approximately the same except where space is needed for external wiring wherein the distance between shelves may be slightly greater. The depth D is necessarily less than 12 inches and preferably less than 7 inches. The height, H, is typically about 56 inches and the width, W, is typically about 41 inches. Internal shelves have dimensions that are slightly less than D and W in order to fit inside of the cabinet 11. Each shelf has a hole on the left side. For example, shelf 41 has hole 46, shelf 42 has hole 47, with shelf 43 having hole 48 and shelf 44 having hole 49. The bottom shelf 45 does not have a hole except if power output is taken from the bottom of the cabinet. The holes are for electrical wire communication so that power cables from the modules may be combined.

On each shelf is a battery module. Shelf 41 seats module 51. Shelf 42 seats module 52. Shelf 43 seats module 53, Shelf 44 seats module 54 and shelf 45 seats module 55. Each battery module is mechanically secured to a shelf. Battery modules 42, 43, 44 and 45 occupy more than two-thirds of the lateral widthwise space on a shelf and all of the depthwise space. Typical dimensions of a battery module, such as module 52 are 33" wide, 9" high and 6" deep on a shelf having the preferred dimensions mentioned in the previous paragraph. The depth of a module corresponds to the depth of a shelf. In turn the depth of a shelf corresponds to the cabinet depth minus space allowing a shelf to be seated in the cabinet. The battery module 51 seated on shelf 41 has a smaller width dimension of 19" wide to allow for an electronics controller 57 to be affixed to the back wall of the cabinet above shelf 41. Each of the optional battery modules occupies more than 3/4 the height between shelves, but not the entire height, allowing for insertion and replacement of battery modules on a shelf.

Figure 5:
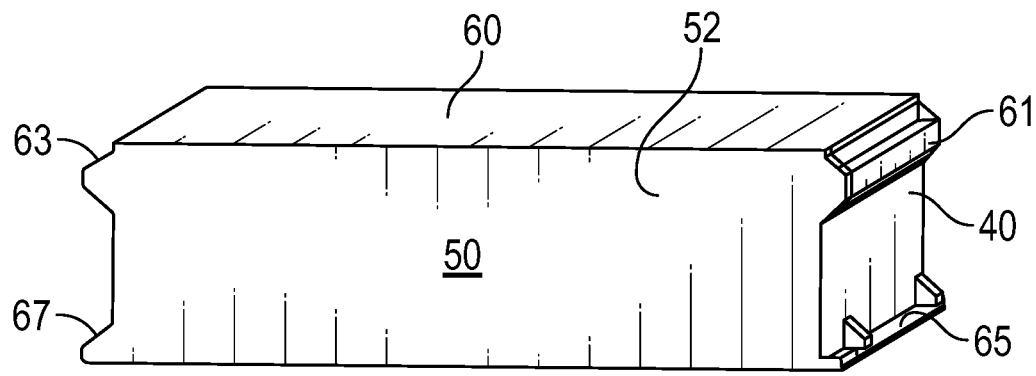
FIG. 5 is a front perspective external view of a full-size battery module of FIG. 4.

With reference to FIG. 5, each battery module, such as battery module 52, is seen to have upper protrusions 61 and 63 at opposed vertical ends of the module. The protrusions are trapezoidal in cross section and serve as finger handles for lifting a module. Each battery module has lower protrusions 65 and 67, parallel to the upper protrusions, that serve for fasteners to a shelf. The protrusions extend out about 1.5 inches. Protrusions 61 and 65 abut an end of a shelf and provide space for wiring to extend from a bank of batteries to run to an opposite end of the module. The module has a top wall 60, a front wall 50 and a right-side wall 40

Figure 6:
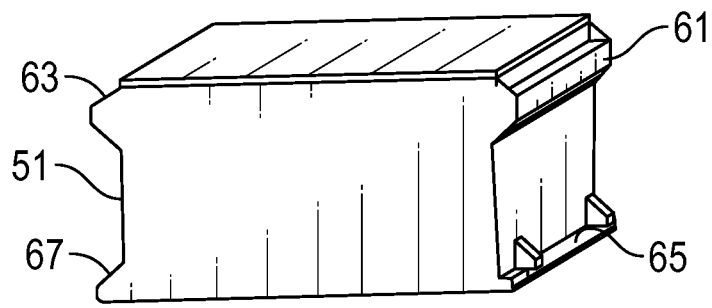
FIG. 6 is a front perspective external view of a reduced size battery module of FIG. 5.

FIG. 6 is a module 51 similar to the one shown in FIG. 5 except with a small width dimension for the top shelf of the cabinet to allow room for an electronics package on the top shelf.

Figure 7:
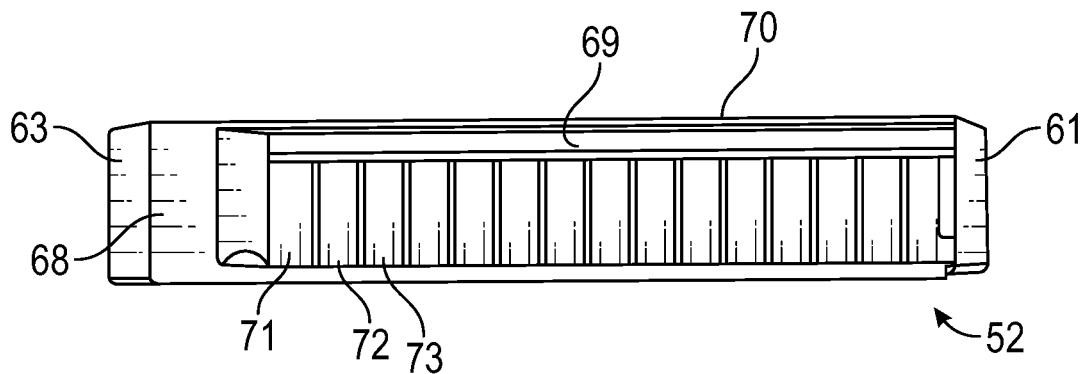
FIG. 7 is a top view of the apparatus of FIG. 5 with top cover removed.

In FIG. 7 a top cover of a battery module 52 is removed revealing an underlying structure 68. Module 52 allows snug packing of a battery bank that includes vertically standing batteries 71, 72, 73 and so on, all fastened in place. The battery bank occupies the entire module in the width direction and in the depth direction between the back wall 70 and front wall 50 of FIG. 5. There is a small raceway below the batteries, not shown, for a cable path extending in the widthwise direction. Similarly, there is a small space above the batteries and below the module cover for wiring.

The module supports an adapter wall 69 that stands in the vertical direction and extends laterally in the battery module width direction. The adapter walls allow snug packing of vertically standing batteries 71, 72, 73, and so on, while at the same time providing space for wires running along the back of the module, confined by module back wall 70. Optional metal fins provide thermal stability and cooling while providing mechanical bracing of the adapter back wall 69 to module back wall 70. Adapter back wall 69 allows more than half of the depth of the module as battery space.

Figure 8:
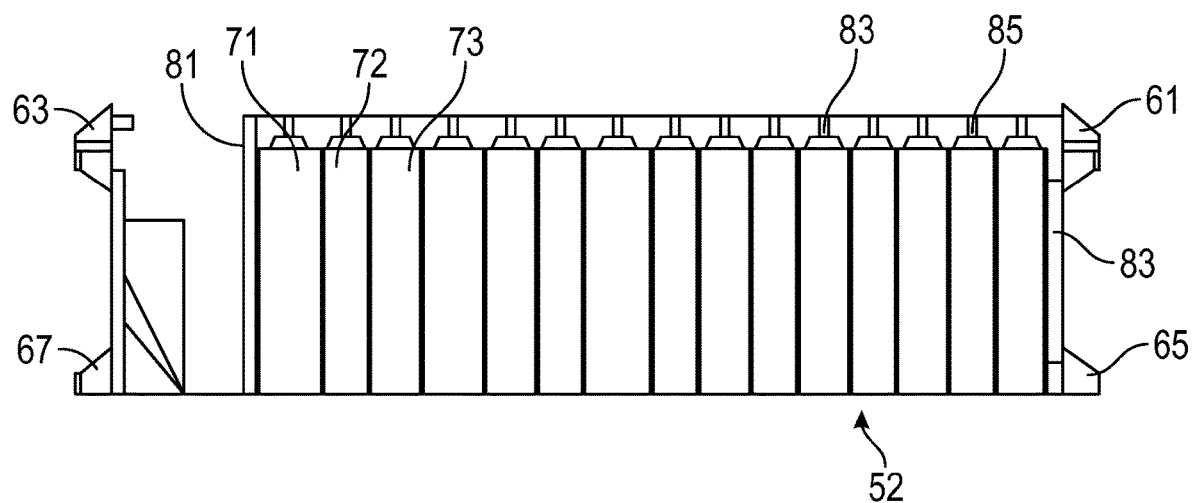
FIG. 8 is a side view of the apparatus of FIG. 5 with a front cover removed.

In FIG. 8 a front cover of battery module 52 is removed, but the upper protrusions 61 and 63 are seen on opposed ends of the module above the lower protrusions 65 and 67. The top cover of the module is also removed, revealing adapter wall 81 standing in the vertical direction allowing snug packing of vertically standing batteries 71, 72, 73 and so on. The batteries have positive and negative terminals, such as terminals 83 and 85, below the top cover. Batteries may be joined in series with a terminal of a battery of one polarity joined to a terminal of the opposite polarity of an adjacent battery, thereby allowing voltage to be stacked.

For example, a joinder of five 2.3 volt cells would form an 11.5 volt array. In this manner and optimal working voltage of 48 volts for a module can be achieved. A plurality of modules on shelves, each with the optimal working voltage, provides the required energy needed at an inverter.

Figure 9:
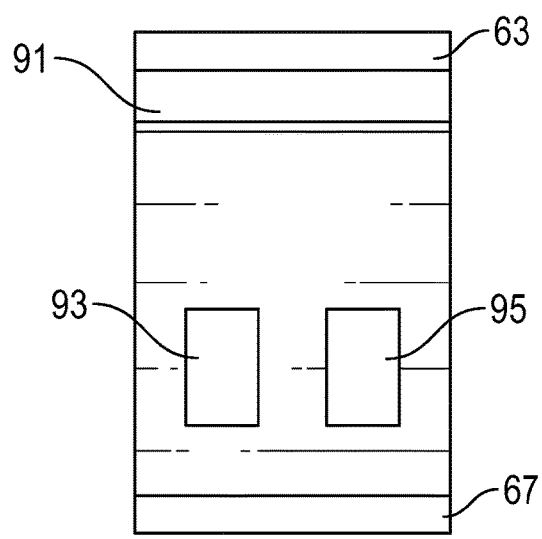
FIG. 9 is a left end view of the apparatus of FIG. 5.
Figure 10:
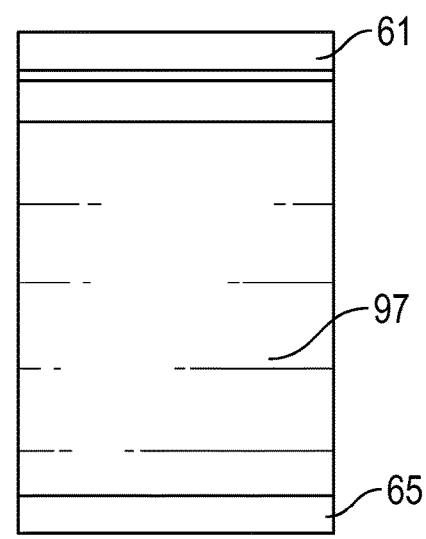
FIG. 10 is a right end view of the apparatus of FIG. 5.
Figure 11:
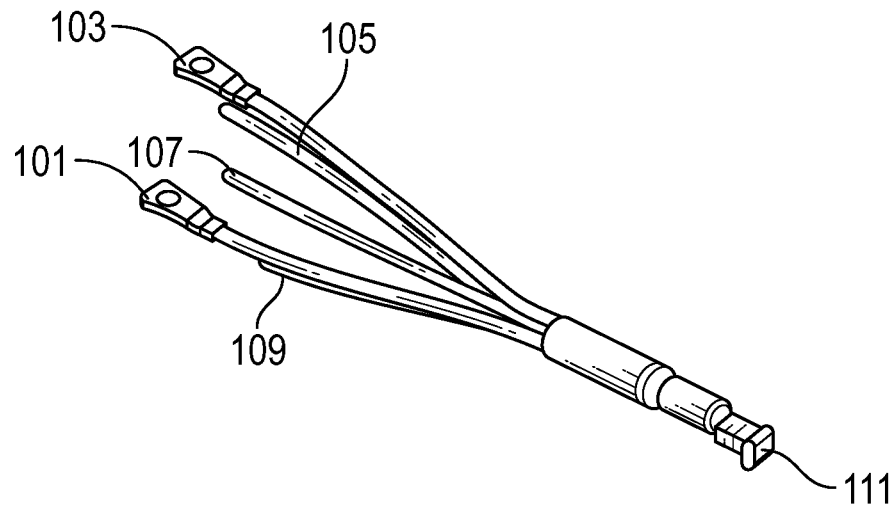
FIG. 11 is a wiring harness used in the apparatus of FIG. 5.

In FIG. 9 a module left end wall 91 is seen to have a power connector port 93 and a signal wire connector port 95. On the other hand, the right end wall 97, seen in FIG. 10, has no ports and a planar appearance. In FIG. 11, a power cable is shown running from the left side of a module toward the power connector port 93. The power cable has wires of positive and negative polarities, 101 and 103 coming from joinder of individual batteries as explained above with reference to FIG. 8. A connector 111 is placed in the power connector port 93 of FIG. 9. Similarly, signal wires indicative of battery temperature and voltage, not shown, may run in a signal cable and terminate in a connector placed in the signal wire connector port 95. The power cable is much thicker than the signal cable but both cables run in the space provided by the adapter back wall explained with reference to FIG. 7 between the adapter wall and the module back wall. The adapter wall provides thermal insulation between the power cable and battery cells, avoiding localized heating of battery cells.

Figure 12:
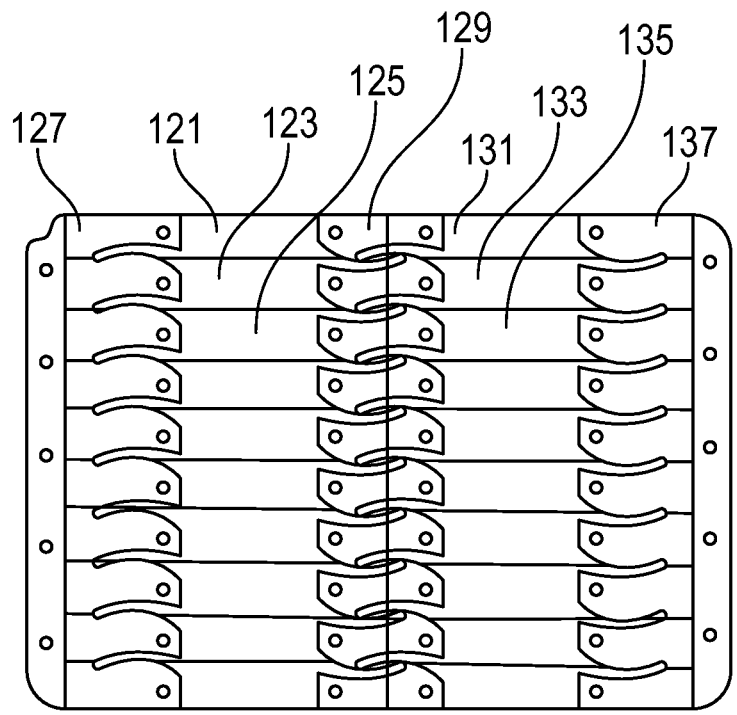
FIG. 12 shows conductive battery connectors for joining positive and negative terminals of individual batteries.

In FIG. 12 batteries may be flatly positioned and strapped together, rather than vertically positioned as in FIG. 8. The batteries of FIG. 12 have the same dimensions as in FIG. 8 but have major dimensions in a horizontal plane. Horizontally disposed batteries 121, 123, 125 and so on have major dimensions lying horizontally in a stack. Battery straps are provided that will work in either horizontal or vertical battery alignment. Terminals of a first polarity are welded to metal strap 127 while terminals of a second polarity are welded to metal strap 129. The adjacent horizontally disposed batteries 131, 133, 135 and so on are similarly stacked. Terminals of the first polarity are welded to metal strap 129 while terminals of the second polarity are welded to metal strap 137. Other flatly position batteries may be joined in a battery array analogous to FIG. 8. Note that each of the straps 127, 129 and 137 is unitary and with comb-shaped blades having a small slit between adjacent blades allowing for minor displacement due to expansion or contraction or vibration. Battery thermal displacement using the space between blades reduces terminal wear and electrical non-conductivity over long periods of time. Welding of terminals to the blades of the straps prevents separation of terminals by corrosion. Strap 129 is a double strap having back-to-back or nose-to-tail terminals of identical potential. In this manner battery voltage with terminals of the same polarity in a column of battery cells is a parallel battery arrangement and terminals of opposite polarity in another column of battery cells increases voltage by battery stacking. Double straps are not used at ends of the battery bank. Straps 127 and 137 are end straps, while strap 129 is a back-to-back or nose-to-tail strap.

Returning to the power cable of FIG. 11, the cable is used with end straps seen in FIG. 12 to have 5 wires that are joined to the 5 holes on the edge of each comb. The 5 wires 101, 103, 105, 107 and 109 are merged into a single male plug terminal 111 for output. End straps of FIG. 12 thus terminate in two plugs of opposite polarity.

Figure 13:
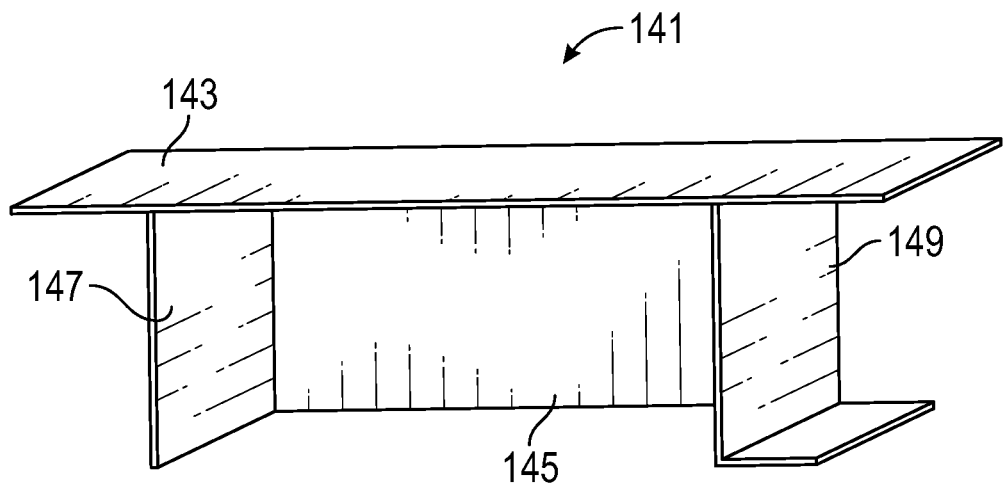
FIG. 13 is a first embodiment of an adapter for seating an array of batteries in a snug volumetric configuration within a battery module of the type shown in FIG. 5.
Figure 14:
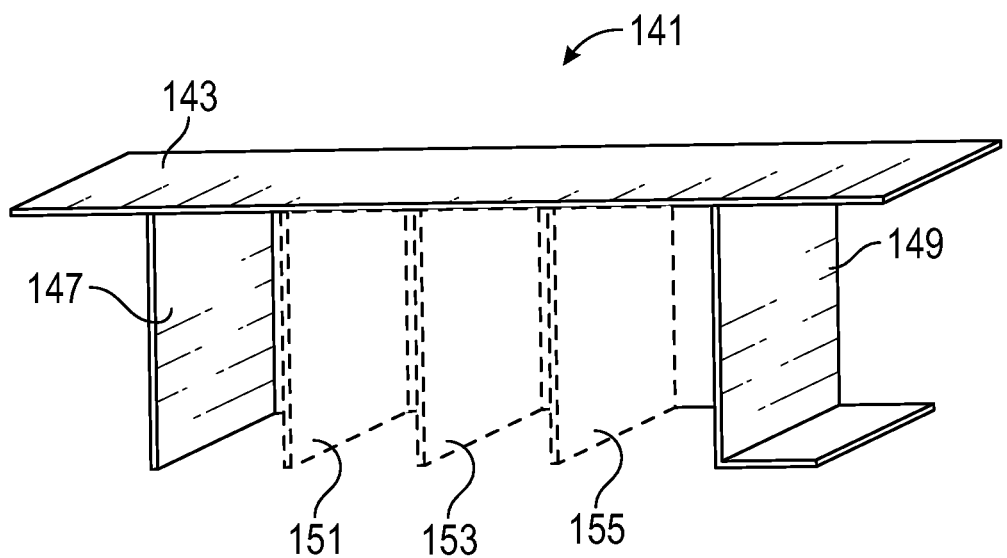
FIG. 14 is a second embodiment of an adapter for seating an array of batteries in a snug volumetric configuration within a battery module of the type shown in FIG. 5.

In FIG. 13, an adapter 141 fits with a module and allocates space within the module so that battery cells fit in a horizonal orientation therein. A battery bank fits in a volumetric space between the left side wall 147 and right-side wall 149 covered by top wall 143 and bounded by back wall 145. Overhang regions of the top wall locate the adapter within a module so that wiring can be run in the overhang region and behind the back wall 145. In the alternate embodiment of FIG. 14, cells are oriented horizontally and the volumetric space between left and right-side walls 147 and 149 is divided by vertical walls or fins 151, 153 and 155, shown in dashed lines are on the back side of the adapter. Optional top walls and bottom walls are not shown.

Figure 15:
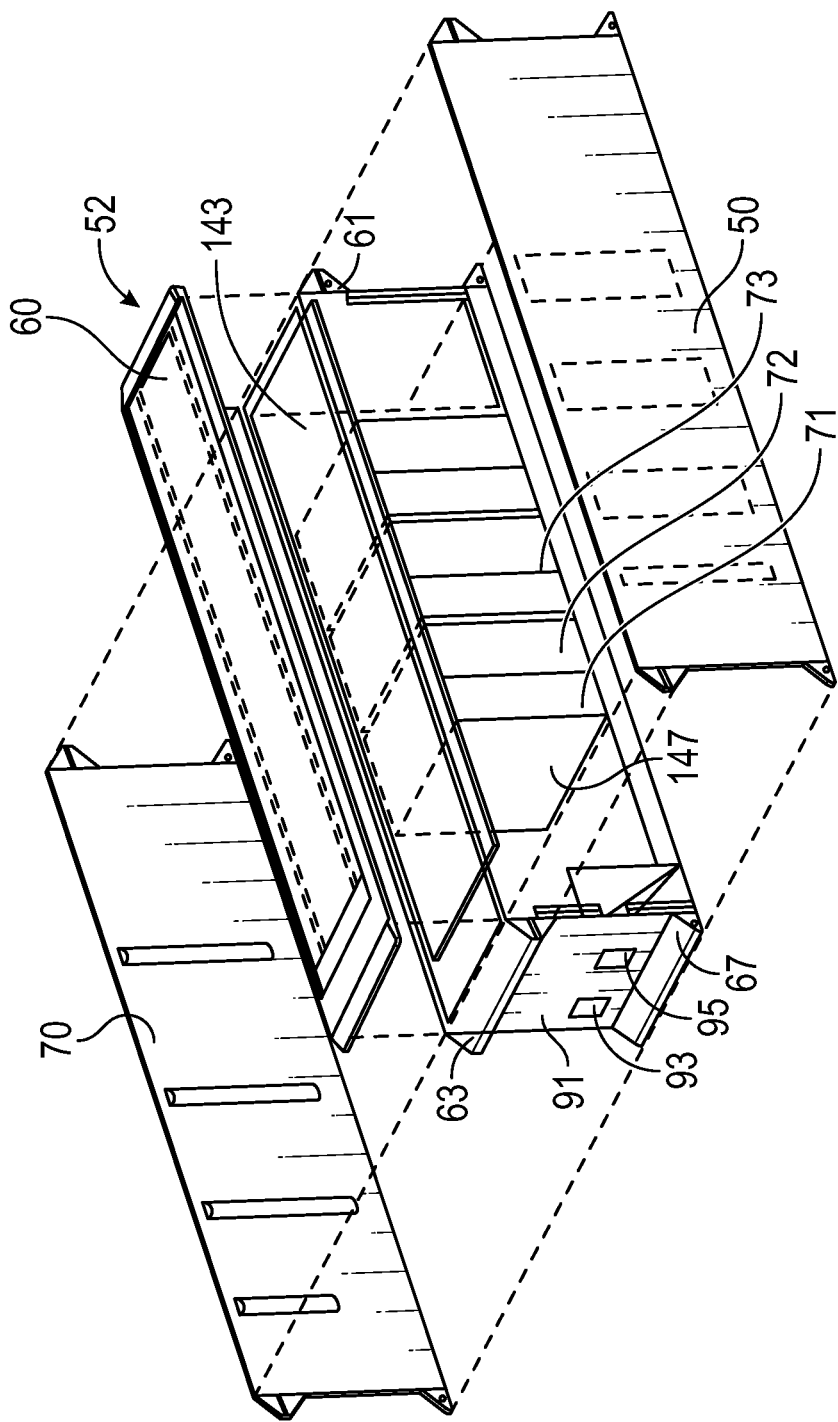
FIG. 15 is an exploded view of a battery module seating an array of batteries in a snug volumetric configuration with an adapter.

In FIG. 15, a module 52 has a back wall, a top wall and a left side wall with an upper protrusion 63 and a lower protrusion 67. An adapter has a top wall 143, a left side wall 147 snugly nesting batteries 71, 72, 73 and so on in a battery bank. Power emerges from the power connector port 93 while signal lines emerge from signal connector port 95. Each module is secured by fasteners to a shelf in the cabinet of FIG. 1.

What is claimed is:

1. An energy storage apparatus for a bank of batteries comprising:
   a fixed, wall mounted cabinet having a plurality of spaced apart shelves secured in place on left, right and back sides of the shelves by walls of the cabinet, the cabinet and shelves having a preselected depth, the cabinet closed on all sides enclosing the shelves;
   a battery module fixed to each of said shelves, the module having a depth corresponding to the depth of a shelf and seating a plurality of batteries fixed within each module and electrically connected to each other for energy delivery, the batteries transmitting power through a power port defined in a module through comb-shaped battery straps having blades of the comb-shaped straps contacting battery terminals of specified polarity along columns of such terminals in a column of batteries on each shelf and joined to ports by cables merging to a plug, with the ports of each module transmitting power in wiring running through holes in each shelf and in regions behind a back wall of each module to allow modules on adjacent shelves to be combined, and from a bottom shelf out of the cabinet;
   a fixed adapter in the volumetric space between shelves; and
   a plurality of battery cells fixed within each adapter and electrically connected to each other by the comb-shaped straps for energy delivery, the battery cells of each adapter communicating power to the power port;
   wherein each adapter has a left side wall having power and signal ports for receiving respective power and signal cables running behind a back wall of the adapter in the volumetric space between that adapter and a back wall of the cabinet.

2. The apparatus as in claim 1 wherein the power cable is a plurality of wires terminating in a plug terminal for output.

\* \* \* \* \*